Patented Apr. 2, 1935

1,996,388

UNITED STATES PATENT OFFICE 1,996,388

PROCESS OF PRODUCING CHLORPICRIN

William D. Ramage, Pittsburg, Calif., assignor to Great Western Electro-Chemical Company, San Francisco, Calif., a corporation of California No Drawing. Application June 25, 1932, Serial No. 619,354

18 Claims. (Cl. 260—144)

This invention relates to the formation of products by the chlorination of nitro compounds and particularly to the manufacture of chlorpicrin by chlorination of nitro compounds.

It is known that chlorpicrin can be made by reacting picric acid with bleaching powder and by the reaction between calcium picrate and calcium hypochlorite. Among the studies made of the last reaction are statements to the effect that an excess of lime has no bad effect on the yield of chlorpicrin when the calcium picrate and hyprochlorite are reacted. I have found that at best this statement is only partially correct and that beyond certain limits, excess lime had a very objectionable effect. Because of the limited solubility of lime only a relatively small lime excess is effective to reduce the yield of chlorpicrin. This I have determined is because of the effect of the alkali present on the pH value of the solution. I have discovered, among other things having to do with this invention, that the pH value of the solution is best maintained within certain limits and that when these limits, which in some cases are relatively narrow, are exceeded, the yield is deleteriously affected.

My invention is probably best understood by considering certain details of the manufacture of chlorpicrin from substituted phenols, particularly sodium picrate, although the explanation and findings are applicable to other compounds and picric acid salts—the calcium and potassium salts, as well as to the acid and to reactions with other hypochlorites.

The invention is applicable to the production of chlorpicrin from other nitro compounds and to the chlorination of nitro compounds generally. Thus, I have successfully produced chlorpicrin from aromatic nitro compounds as well as aliphatic nitro compounds and have secured higher yields, by means of the present invention, on chlorinating nitro hydrocarbon compounds generally.

The following equations express various observed experimental facts.

(1) $C_6H_2(NO_2)_3ONa + 11HOCl \rightarrow 3CCl_3NO_2 + 6H_2O + 3CO_2 + NaCl + HCl$ (2) $C_6H_2(NO_2)_3ONa + 10HOCl + NaOCl \rightarrow 3CCl_3NO_2 + 6H_2O + 3CO_2 + 2NaCl$ (3) $C_6H_2(NO_2)_3ONa + 7HOCl + 4NaOCl \rightarrow 3CCl_3NO_2 + 3H_2O + 3NaHCO_3 + 2NaCl$ (4) $C_6H_2(NO_2)_3ONa + 4HOCl + 7NaOCl \rightarrow 3CCl_3NO_2 + 3H_2O + 3Na_2CO_3 + 2NaCl$ (5) $C_6H_2(NO_2)_3ONa + 11NaOCl + H_2O \rightarrow 3CCl_3NO_2 + 3Na_2CO_3 + 4NaOH + 2NaCl$ When hypochlorous acid alone is used (Eq. 1), hydrochloric acid is liberated, while when hypochlorite alone is used (Eq. 5), alkali is liberated. In the intermediate cases (Eqs. 2, 3 and 4), the pH is such that a certain amount of hypochlorous acid is present and the maximum yields were then obtained. When approximately two parts of hypochlorous acid to one of hypochlorite (Eq. 3) were present, the maximum yields were obtained although when the ratio was reversed (Eq. 4), the yields were nearly as high and less foaming occurred under the more alkaline condition. From Equation 5 the effect of excess hypochlorite can be seen—the formation of alkali which raises the pH and makes the solution too alkaline to secure the maximum yield.

The amount of alkali should be such that hypochlorous acid exists and the final pH of the solution, after reaction, is substantially that of the hypochlorous acid. If the pH is either higher or lower than the pH of hypochlorous acid, the yield is affected. Obviously, the formation of a strong acid (Eq. 1) or alkali (Eq. 5) affects the pH materially and these conditions should be avoided to get maximum yields.

In the case of chlorinating aliphatic nitro compounds, the observation of pH control is much more critical than in the case of aromatic nitro compounds. Thus, substantially quantitative yields have been obtained upon chlorinating nitro methane by observing the restrictions I have mentioned relative to the pH value of the solution.

(6) $H_3CNO + 3HOCl \rightarrow CCl_3NO_2 + 3H_2O$ (7) $H_3CNO + 2HOCl + NaOCl \rightarrow CCl_3NO_2 + NaOH + 2H_2O$ (8) $H_3CNO + 2NaOCl + HOCl \rightarrow CCl_3NO_2 + 2NaOH + H_2O$ (9) $H_3CNO + 3NaOCl \rightarrow CCl_3NO_2 + 3NaOH$ From the above reactions, it is apparent that, in the chlorination of nitro methane, hypochlorous acid gives the correct chlorinating conditions. The presence of free chlorine causes the liberation of acid and the presence of hypochlorites causes the liberation of alkali. Maximum yields were obtained in this case using straight hypochlorous acid as the only chlorinating agent, the pH being about 6. In practically all other cases studied, the maximum yields were obtained with mixtures of hypochlorous acid and a hypochlorite, the pH from 5 to 9, preferably not much over 8. The basic requirement is, however, the same in all cases, namely that the pH shall remain at all times in the range of hypochlorous acid and, preferably, at the pH of the acid.

The nitro methane can be prepared in various ways as by the reaction between chloracetic acid and sodium nitrite. The nitro methane can be distilled directly into a hypochlorous acid solution or the chlorination with the acid conducted in the vessel where the nitro methane was formed.

The following examples are illustrative of how my invention has been successfully practised.

*Example 1*

45 lbs. of picric acid and 8 lbs. of Ca(OH)$_2$ were mixed with 10 gallons of water in an autoclave. 150 lbs. of chlorine were then added to the autoclave in the form of a dilute solution of calcium hypochlorite and hypochlorous acid, one third of the chlorine being present as hypochlorous acid so that there were two parts of hypochlorite to one of the acid. The mixture was agitated at 20° C. for one hour. Steam was then admitted and the chlorpicrin distilled off. Yield of chlorpicrin—87 lbs.

*Example 2*

A hypochlorous acid solution was prepared by passing 150 lbs. of chlorine into an agitated and cooled suspension of finely divided CaCO$_3$ in water. 33 lbs. of nitromethane were then added. The temperature was kept below 20° C. during the reaction period. After twenty minutes, the reaction mixture was heated to boiling and the chlorpicrin distilled off. The yield of chlorpicrin—89 lbs.—was practically quantitative.

From the foregoing I believe it will be apparent that I have disclosed a process whereby chlorination of nitro compounds can be conducted to secure maximum product yields consistently by observation of the optimum pH for a given set of reacting conditions and components. The optimum ratio of hypochlorous acid to hypochlorite can be readily determined for nitro compounds other than picric acid or its salts and the maximum yields thereby secured.

I claim:

1. That step in a chlorination process to form chlorpicrin which consists in conducting said chlorination process with a chlorinating agent whose principal effective constituent is hypochlorous acid.

2. That step in a chlorination process to form chlorpicrin which consists in conducting said chlorination process with a chlorinating agent consisting substantially of hypochlorous acid.

3. That step in a chlorination process to form chlorpicrin which consists in conducting said chlorination process with hypochlorous acid as the chlorinating agent.

4. That step in the process of chlorinating a solution to form chlorpicrin therein which consists in chlorinating with a chlorinating agent consisting substantially of hypochlorous acid.

5. The process of forming chlorpicrin which comprises chlorinating nitro-methane with hypochlorous acid.

6. The process of forming chlorpicrin which comprises chlorinating nitro-methane with a chlorinating agent consisting mainly of hypochlorous acid.

7. That step in the process of chlorinating a solution to form chlorpicrin therein which consists in chlorinating with a chlorinating agent comprising hypochlorous acid and a hypochlorite.

8. That step in the process of chlorinating a solution to form chlorpicrin therein which consists in chlorinating with a chlorinating agent comprising hypochlorous acid and a hypochlorite, the pH of said solution being substantially that of hypochlorous acid.

9. That step in the process of chlorinating a solution to form chlorpicrin therein which consists in chlorinating with a chlorinating agent comprising hypochlorous acid and a hypochlorite, the proportion of hypochlorous acid and hypochlorite being such that the pH is substantially maintained in the pH range of hypochlorous acid as the reaction proceeds.

10. That step in a chlorination process to form chlorpicrin which consists in chlorinating in a solution buffered to maintain a substantially constant pH value on the acid side.

11. That step in a chlorination process to form chlorpicrin which consists in chlorinating nitromethane in a solution buffered to maintain a substantially constant pH value favorable to the existence of hypochlorous acid.

12. That step in a chlorination process to form chlorpicrin which consist in chlorinating in a solution buffered to maintain a substantially constant pH value favorable to the existence of hypochlorous acid at about 6 and below 7.

13. That step in a chlorination process to form chlorpicrin which consists in chlorinating in a solution buffered to maintain a substantially constant pH value favorable to the existence of hypochlorous acid between 5 and 9 and at a temperature of about 20° C.

14. That step in the chlorination process to form chlorpicrin which consists in chlorinating in a solution buffered to maintain a substantially constant pH value on the acid side favorable to the existence of hypochlorous acid.

15. That step in a chlorination process to form chlorpicrin which consists in chlorinating nitromethane to chlorpicrin in a solution buffered to maintain a substantially constant pH value on the acid side favorable to the existence of hypochlorous acid.

16. That step in a chlorination process to form chlorpicrin which consists in chlorinating nitromethane to chlorpicrin in a solution having a pH value on the acid side favorable to the existence of hypochlorous acid.

17. Forming chlorpicrin by chlorinating nitromethane in an acid solution.

18. A process of treating nitromethane which comprises substituting chlorine for all hydrogen in said nitromethane by the action of a chlorine acid.

WILLIAM D. RAMAGE.